(12) United States Patent
Hämäläinen

(10) Patent No.: US 7,586,434 B1
(45) Date of Patent: Sep. 8, 2009

(54) METHOD AND SYSTEM FOR MAPPING A TARGET SCENE USING SCANNING RADAR

(75) Inventor: Mikael Hämäläinen, Uppsala (SE)

(73) Assignee: SAAB AB, Linköping (SE)

( * ) Notice: Subject to any disclaimer, the term of this patent is extended or adjusted under 35 U.S.C. 154(b) by 218 days.

(21) Appl. No.: 11/277,772

(22) Filed: Mar. 29, 2006

(30) Foreign Application Priority Data

Mar. 29, 2005  (EP)  ................................. 05445017

(51) Int. Cl.
*G01S 13/00* (2006.01)
(52) U.S. Cl. .................. 342/25 R; 342/25 A; 342/25 B; 342/74; 342/89
(58) Field of Classification Search .................... 342/68, 342/25
See application file for complete search history.

(56) References Cited

U.S. PATENT DOCUMENTS

| | | | | |
|---|---|---|---|---|
| 3,609,762 | A * | 9/1971 | Diamantides | 342/108 |
| 4,134,113 | A * | 1/1979 | Powell | 342/25 C |
| 5,245,347 | A * | 9/1993 | Bonta et al. | 342/149 |
| 5,608,404 | A * | 3/1997 | Burns et al. | 342/25 A |
| 5,627,543 | A * | 5/1997 | Moreira | 342/25 A |
| 6,750,809 | B1 * | 6/2004 | Cho et al. | 342/129 |
| 6,885,334 | B1 * | 4/2005 | Hager et al. | 342/62 |
| 2004/0141170 | A1 * | 7/2004 | Jamieson et al. | 356/5.01 |
| 2006/0152402 | A1 * | 7/2006 | Krikorian et al. | 342/25 A |

OTHER PUBLICATIONS

Mahafza, B. R. et al.: "Forward-Looking SAR Imaging Using A Linear Array With Transverse Motion". Apr. 4, 1993, New York, NY, 4p. ISBN 0-7803-1257-0.
Lohner A.K.. "Improved azimuthal resolution of forward looking SAR by sophisticated antenna illumination function design." Radar, Sonar Navig., vol. 145, No. 2, Apr. 1998, pp. 128-134.
Wehner D. R., "High Resolution Radar", 2nd Edition, Artech House, 1995.
Soliman S. S., "Continuous and Discrete Signals and Systems". pp. 194-199. The Fourier Transform, Chapter 4., Prentice-Hall, 1990.
Carrar et al., "Spotlight Synthetic Aperture Radar, Signal Processing Algorithms", Chapters 1 and 2, Artech House, 1995.

* cited by examiner

*Primary Examiner*—Thomas H Tarcza
*Assistant Examiner*—Timothy A Brainard
(74) *Attorney, Agent, or Firm*—Connolly Bove Lodge & Hutz LLP

(57) ABSTRACT

A system and method for mapping a target scene by means of scanning radar utilizing the Doppler effect that arises in the event of movement between radar and target scene, where the movement of a platform upon which the radar's antenna is mounted is calculated utilizing navigation data obtained for the platform. The system and method can generate high-resolution radar images in an almost forward-looking application. This is achieved by introducing an approach compensation (7), in which the signal quantity received by the radar which is related to transmitted pulses is transformed pulse by pulse to a corresponding movement-corrected signal quantity by displacement in time and phase, dependent upon the platform's movement along an imaginary platform movement directed in such a way that the antenna's momentary direction is essentially 90° to the direction of the movement of the imaginary platform.

20 Claims, 7 Drawing Sheets

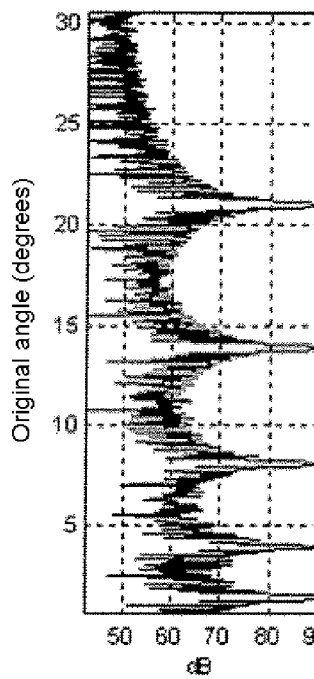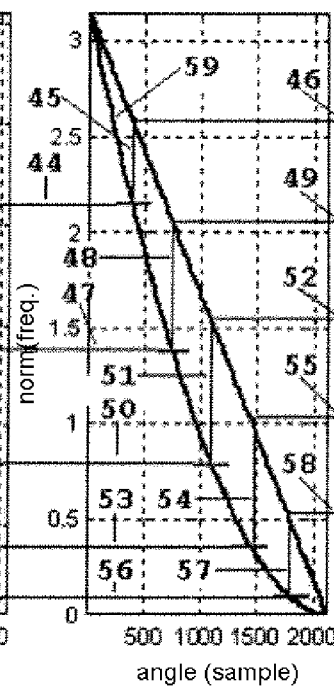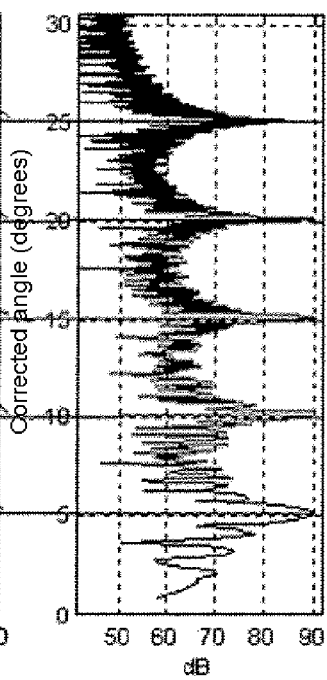
Figure 8a    Figure 8b    Figure 8c
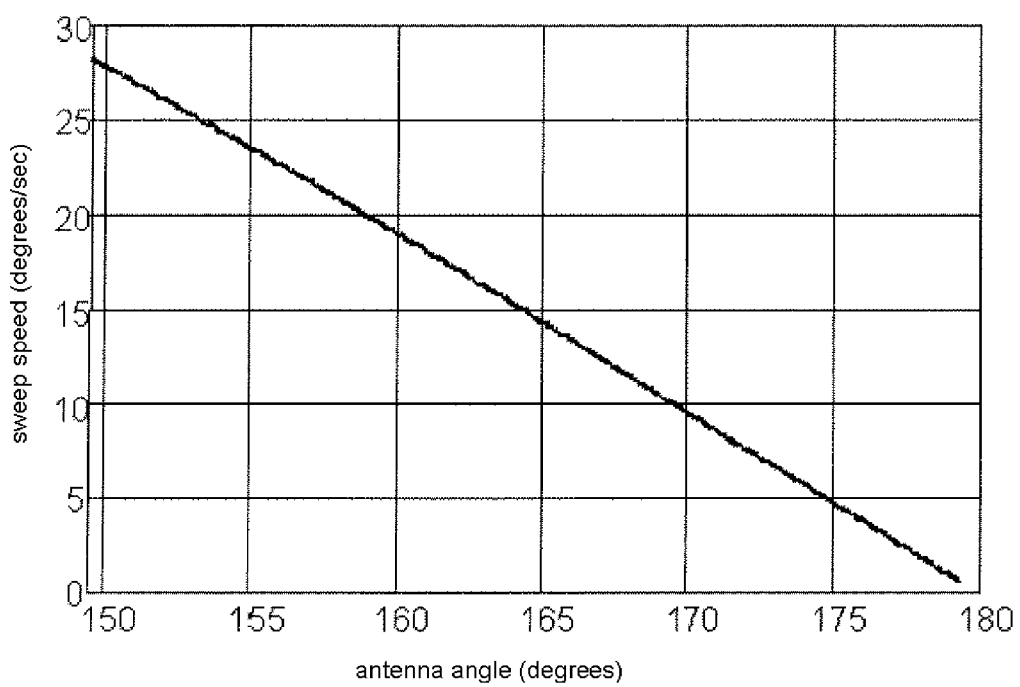
Figure 9

METHOD AND SYSTEM FOR MAPPING A TARGET SCENE USING SCANNING RADAR

CROSS REFERENCE TO RELATED APPLICATIONS

This Application claims priority under 35 U.S.C. §119 to European Patent Application 05445017.6 filed on Mar. 29, 2005, the entire contents of which are incorporated herein by reference.

BACKGROUND

The present disclosure relates to a system and method for mapping a target scene using scanning radar utilizing the Doppler effect that arises in the event of movement between the radar and the target scene, in which the movement of a platform on which the radar's antenna is mounted is calculated utilizing navigation data obtained for the platform.

As radar is one of the few available sensors for detailed ground mapping, there are continual requirements for further development of the technology. Other commonly used sensors, such as infrared and video sensors, utilize only image processing for image analysis, whereas, using radar technology, it is also possible to take advantage of the signal characteristics that are unique for each specific target. The radar technology has thus the advantage that signal processing and image processing can be combined.

Viewed historically, radar has been of great significance in association with military applications. At its commencement, the technology made possible the detection of aircraft and vessels. In spite of the limitations of the systems of the time, the enemy could usually be detected in good time, whereby unnecessary losses were avoided. Today, thanks to the developments in technology, detection capabilities have improved considerably. As modern radar technology, in combination with complex signal and image processing, in many cases enables radar images to be of photographic quality, reconnaissance over land and inside archipelagos is nowadays a normal radar application.

In spite of the developments, problems still remain that restrict the use of radar. One such a problem relates to the ability to generate high-resolution radar images within an adjacent angular interval around the platform motion direction. Phenomena that limit the image generation include Doppler variation and range or distance variation. Both phenomena will be discussed in greater detail below with reference to the figures. A situation as described above with forward-scanning radar is very common in association with military applications, where an approach is expected to take place in the direction of the target.

Ever since the principles of Doppler resolution became known, radar engineers have tried to utilize in an optimal way the Doppler effect that arises when there is movement between radar and target scene. It will be demonstrated below that the Doppler bandwidth is of decisive importance for the size of the angular resolution. As the illumination angle, that is the angle between movement vector and target, has a large influence on the Doppler characteristics of the illuminated target, the angular resolution is also dependent upon a corresponding angle. Angular resolution, that is given by effective antenna beam width $\psi_e$ divided by a predefined beam sharpening factor $R_{FSAR}$, is derived below according to $$\psi_d = \frac{\psi_e}{R_{FSAR}} = \frac{\lambda/l}{\frac{2\lambda v_p}{\omega_s l^2}\sin(\phi)} = \frac{\omega_s l}{2 v_p \sin(\phi)}$$

where $\lambda$ corresponds to the signal's wavelength, l is the physical antenna size, $v_p$ is the platform speed, $\omega_s$ is the antenna's scan rate and $\phi$ is the antenna angle.

At a constant scan rate, all parameters apart from $\sin(\phi)$ can be assumed to be constant. As the term $\sin(\phi)$ is found in the denominator in the correlation above, it can be seen that optimal resolution is obtained for the target angle 90°, while small target angles ($\to 0°$) do not allow any coherent integration. The angle 0° corresponds here to the platform's direction of travel, while the angle 90° corresponds to an antenna angle perpendicular to the direction of travel.

In a target seeker application, an angular interval of approximate size±30° is of particularly great interest, as the approach is assumed to be taking place towards a threatening object.

Traditionally, radar modes that utilized forward-scanning antenna have been classified within the category DBS (Doppler Beam Sharpening), see Donald R. Wehner, "High-Resolution Radar, Second Edition", ISBN 0-89006-727-9, Artech House 1995.

The focusing that traditionally was carried out by filtering, often required extremely complex filter banks to be applied. As each subfilter was optimized for a given spectral area (regarding band width and sidelobe handling), a large number of subfilters were required in order to cover the whole spectral area.

As modern spectral analysis increasingly utilizes FFT-based (Fast Fourier Transform) tools, these methods have increasingly replaced old technology. Utilizing FFT-related methods, traditional bandpass filtering can be carried out and, in addition, more precisely matched filtering is made possible. The methods differ in execution and also in how the received signal quantity is to be pre-processed. Focusing by bandpass filtering requires a frequency-expanded signal in order for focusing to be achieved. Matched filtering in turn requires a demodulated signal quantity where angle-separated targets are distinguished by frequency.

Matched filtering integrates all the signal energy belonging to a particular frequency component (a particular target).

Bandpass filtering suppresses unwanted frequency components.

SUMMARY

The great difference in the focusing techniques, signal integration and signal reduction respectively, has led to the former technology increasingly being classified as SAR (Synthetic Aperture Radar), see Carrara, Goodman, Majewski, "Spotlight Synthetic Aperture Radar, Signal Processing Algorithms", ISBN 0-89006-728-7, Artech House 1995, instead of DBS. Hence the method developed according to this disclosure has been given the name "Forward-Scanning Synthetic Aperture Radar (FSSAR)".

How the collected signal quantity is prepared for coherent integration will be discussed in greater detail below with reference to the attached drawings.

The object of the present disclosure is to achieve a system and method by means of which high-resolution radar images can be generated in a forward-scanning application.

The object of the disclosure is achieved by a method characterized in that, for approach compensation, a signal quantity received by the radar related to transmitted pulses is transformed pulse by pulse to a corresponding movement-corrected signal quantity by displacement in time and phase dependent upon the platform's movement along an imaginary platform movement directed in such a way that the antenna's momentary direction essentially forms 90° with the movement vector for the movement of the imaginary platform.

The approach compensation is advantageously carried out in the frequency domain and its size in time T and phase θ is calculated by the correlations:

$$T = 2R/c \text{ and}$$

$$\theta = (4\pi/\lambda_c)R$$

where R is the distance a respective echo is to be displaced, c is the propagation speed and $\lambda_c$ is the signal's wavelength. By carrying out the approach compensation in the frequency domain, it can be carried out effectively and in combination with pulse compression. Pulse compression is known in association with radar applications, but not in combination with other steps comprised in our method, which steps interact in a favourable way.

According to another further development of the system and method according to the disclosure, a reference function is created by: placing a reference target in the platform's direction of movement; assuming that the reference target is illuminated during the whole of the movement of the platform and across all antenna angles; calculating the phase variation $\theta_{ref}$ that has arisen; creating a reference signal according to $S_{ref} = \exp(j\theta_{ref})$; approach compensating $S_{ref}$ and by the signal quantity being demodulated by multiplication by the conjugate of the reference function. The demodulated signal quantity can thereby advantageously be angle focused, preferably by a calculation-efficient Fourier transform (FFT).

According to yet another further development of the system and method according to the disclosure, the angle-focused signal quantity is projected onto a linear frequency scale, whereby a linear correlation is obtained between the target's initial time position and its final frequency position.

According to an embodiment of the method according to the disclosure, the scan rate of the scanning radar is kept constant. In this way, radar systems constructed for constant scan rate, which are normally available on the market, can be utilized to realize the method.

According to an alternative embodiment of the method, the radar's scan rate can be varied to obtain an essentially constant resolution within the scan area. For this, the radar's scan rate $\omega_s$ is suitably determined by the correlation:

$$\omega_s = \frac{2\lambda v_p}{R_{FSAR}l^2}\sin(\phi)$$

where λ corresponds to the signal's wavelength, $v_p$ is the platform speed, $R_{FSAR}$ is the beam sharpening factor, l is the physical size of the antenna and φ is the antenna angle.

The method and system according to the disclosure is particularly advantageous within a limited angular interval in the radar platform's direction of movement and, according to a suitable embodiment of the method, the mapping of the target scene is carried out within an angular range of approximate size±30° during the approach towards the target scene.

According to yet another embodiment of the method, this comprises an IMU-system connected to the radar platform, which continuously measures the movement of the platform. In combination with the IMU-system, there is, in addition, an INS-system which includes a movement calculation filter. The combination of IMU and INS means in this way that the movement of the platform can be kept updated with great precision, which is preferred for the system and method according to the disclosure.

The basic principles according to the method above can be combined with other radar-based mapping methods and a further development of the method is characterized in that other radar-based mapping methods are utilized in combination with the method, in parts of the angular range to be mapped.

BRIEF DESCRIPTION OF THE DRAWINGS

The system and method of this disclosure will be described below in greater detail with reference to the attached drawings, in which:

FIG. 7a is identical to FIG. 6b.

FIGS. 8a-8c show the projection of a non-linear spectrum according to FIG. 7b onto a linear spectrum according to FIG. 8c, with non-linear and linear frequency scales being illustrated in FIG. 8b.

FIG. 9 shows an example of how the radar's scan rate can be varied in order to achieve constant angular resolution, where the angle 180° corresponds to the platform's direction of movement.

DETAILED DESCRIPTION

The system and method will now be described schematically with reference to FIG. 1 and will then be discussed in greater detail in the following with reference to the subsequent drawings.

Figure 1:
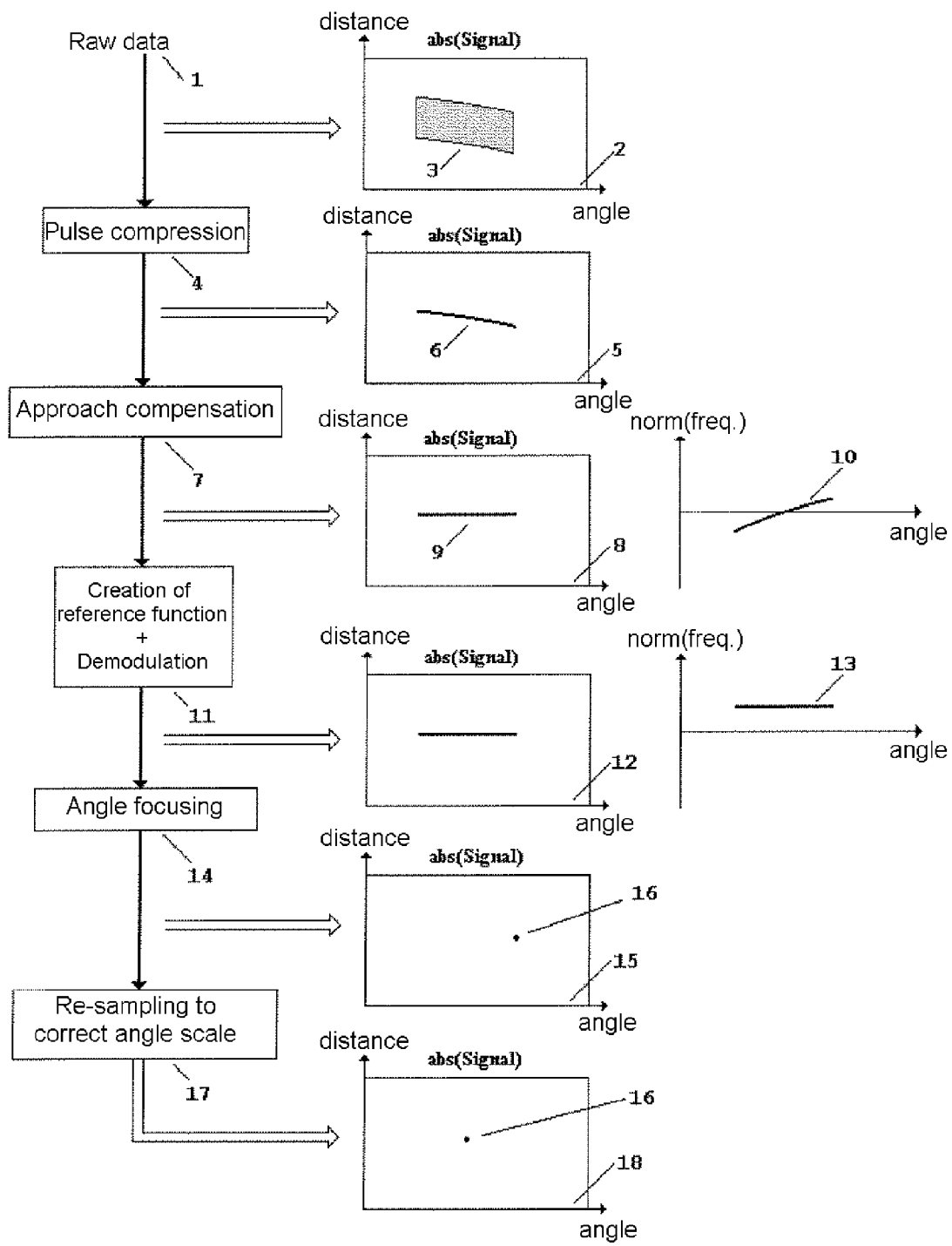
FIG. 1 shows schematically the functions that constitute the system and method according to the disclosure.

According to FIG. 1, there is a received signal quantity in the form of raw data 1. The signal quantity comprises reflections of a previously transmitted pulse. The angular range or distance diagram 2 illustrates the signal quantity's propagation in distance and in angle for a point target 3. As no signal compression has been carried out, the signal is extended in the respective dimensions. In addition to the signal's propagation, the effect of distance variation arising due to the radar platform's approach movement is also shown in the angular distance diagram 2.

As a first step, pulse compression of the received signal quantity is carried out according to known principles within the field of radar technology. The function block has been given the reference numeral 4. The pulse compression that integrates the signal energy in range is suitably carried out in the frequency plane. The angular distance diagram 5 shows the signal's propagation 6 after pulse compression.

In association with pulse compression, or as a subsequent element, approach compensation is carried out in a function block 7. In principle, an imaginary movement of the radar platform is carried out, on the basis of the radar platform's actual movement and direction of scan in relation to the target scene. The approach compensation compensates for platform motion-dependent time and phase displacement. The angular distance diagram 8 shows how the signal energy for a point target 9 is placed at the same range gate after time compensation has been carried out. An angular frequency diagram 10 shows how the target's frequency variation is centred around the zero frequency after corresponding phase compensation. The approach compensation is carried out most effectively in the frequency plane, for which reason the embodiment is suitably combined with pulse compression.

A function block 11 creates a reference function and utilizes this reference function for demodulation of the target's frequency variation. How the reference function is created is described elsewhere in this description. The frequency variation of the reference function conforms to frequency variation of the illuminated target with the exception of a constant frequency component, using which the demodulated target is placed in a fixed frequency window according to the angular frequency diagram 13. As the demodulation only adjusts the target's phase, the target's distance remains unchanged according to the angular distance diagram 12.

After demodulation, the signal is angle focused by means of a calculation-efficient Fourier transform (FFT) in a function block 14. The Fourier transform that integrates signal energy as a function of frequency generates an almost point-shaped target 16 in the angular distance diagram 15. However, the focused target is placed in an incorrect angular position as a result of the reference function's non-linear frequency variation. By re-sampling of the non-linear frequency spectrum to a corresponding linear spectrum in a function block 17, a point-shaped target 16 is obtained, which, in the angular distance diagram 18, has assumed a position that conforms well with reality. The relationship between non-linear and linear frequency spectrum is described elsewhere in the description.

The process involved will now be described below in greater detail with reference to FIG. 1 and firstly compensation of the approach speed will be discussed with reference to FIGS. 2, 3, 4a, 4b, 5a and 5b.

Figure 2:
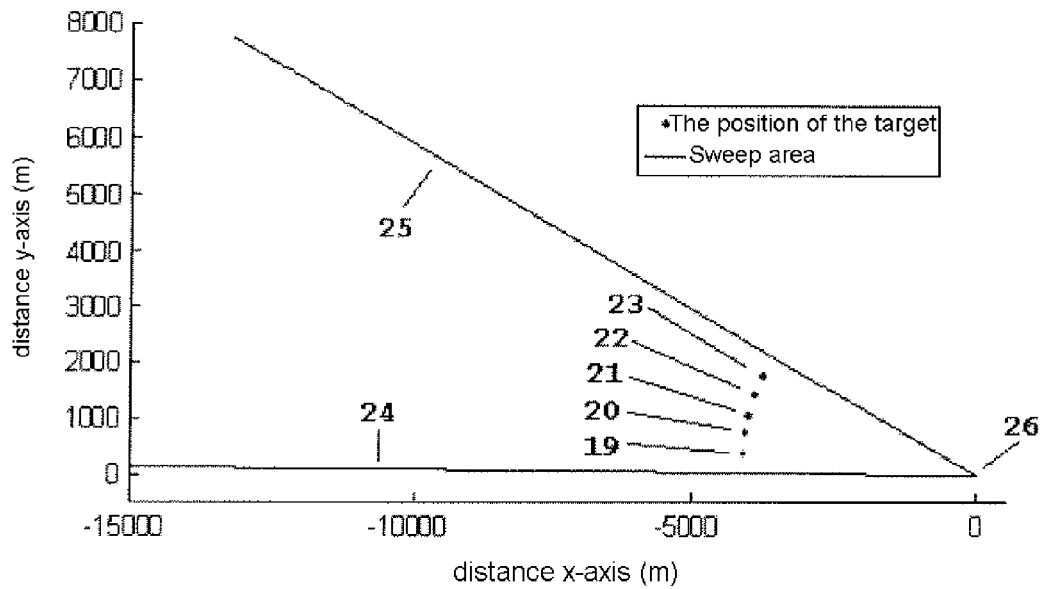
FIG. 2 shows an example of simulation geometry with target positions, scan interval and platform geometry included.

In order to clarify the discussion concerning partial elements that constitute the proposed focusing algorithm, a simulation geometry is utilized according to FIG. 2. In total, five point targets 19-23 are simulated, located at the same distance (4000 meters) and with an angular separation of 5°. The signal characteristics of the respective targets 19-23 are studied step by step in order to demonstrate the interaction of the partial elements. The lines 24 and 25 mark the outer limits of the radar's scan area and the reference numeral 26 marks the position of the platform.

Figure 3:
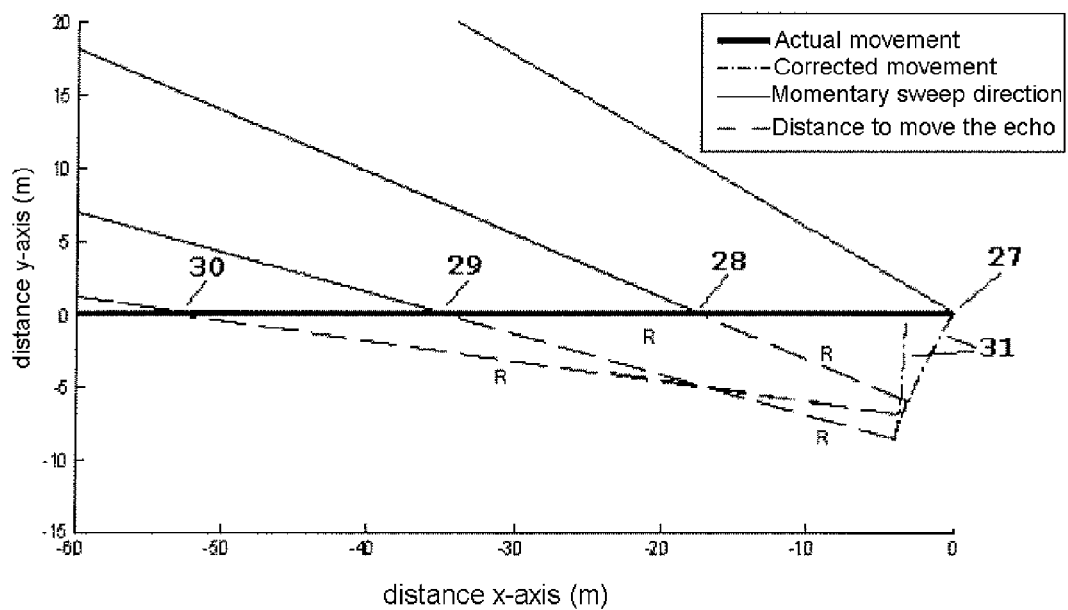
FIG. 3 shows an example of platform movement before and after approach correction by enlargement of the platform area according to FIG. 2.

As for other SAR-algorithms, it is necessary to take into account the approach movement of the platform. Here this is carried out by transforming received signal quantity to a movement-corrected corresponding value. Movement correction is carried out in such a way that all the received signal quantity belonging to a certain transmitted pulse is displaced in time and phase in a suitable way. The size of the displacement depends on the movement of the platform and is calculated using navigation data. FIG. 3 illustrates how movement correction is carried out in the proposed method.

Firstly, a distance R is calculated for each platform position where a pulse is transmitted. In FIG. 3, a pulse has been sent in the positions 27-30. The distance R extends from the respective position 27-30 towards an imaginary movement path 31 for the movement of the platform. The size of R is to be such that a new imaginary platform movement is created, where the momentary antenna direction is 90° relative to the movement of the imaginary platform. In other words, this means that when a corrected movement has been utilized for data collection, a constant antenna direction at right angles to the movement vector would have been required in order to illuminate the same area. The appearance of the corrected movement is of little significance, providing that the above requirement is fulfilled.

The discussed approach compensation is carried out most effectively in the frequency plane and its size is obtained by:

$$T = 2R/c$$

$$\theta = \frac{4\pi}{\lambda_c} R$$

where c is the propagation speed of the signal and $\lambda_c$ is the wavelength of the signal.

Figure 4A:
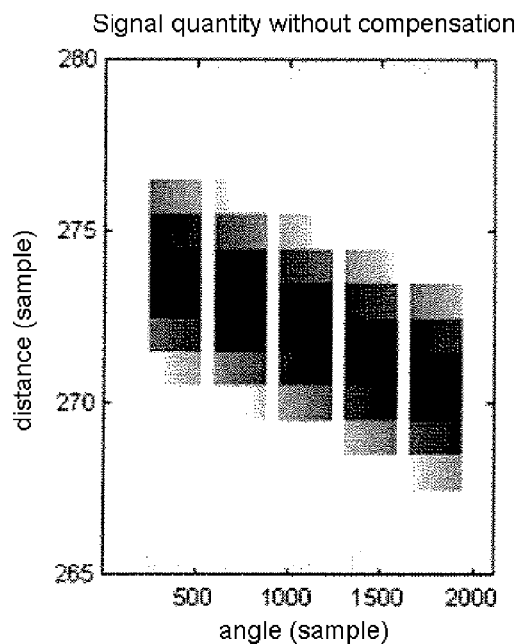
FIG. 4a shows an example of the effect of the distance variation on the signal quantity without time correction, for radar with constant scan.

According to the disclosure, the same target areas are illuminated as in the original data collection geometry, FIG. 1, but, with signal displacement having been carried out (according to T and θ), unwanted signal characteristics are eliminated, which will be discussed next. In movement according to the original geometry, there is an approach between platform and target area, which gives rise to two negative signal effects. Firstly, there is a certain amount of distance variation (dependent on $\omega_s$ & $v_p$), which means that the signal energy moves through a plurality of adjacent range or distance gates. This effect, illustrated in FIG. 4a, results in a distance spreading of focused targets. The time displacement described above with reference to FIG. 3 compensates for the distance variation, whereby the signal energy of the respective target ends up in the correct distance gate. The size of the distance variation in FIG. 4a is moderate, as low platform velocity is combined with high scan rate.

Figure 5A:
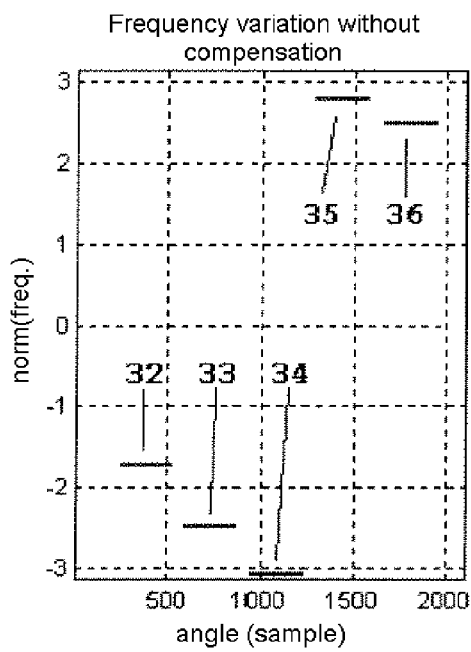
FIG. 5a shows an example of the effect of angle-dependent frequency displacement without phase correction.

The second effect that arises as a result of approach movement is an angle-dependent phase displacement. This results in unwanted wrapping phenomena, which is illustrated in FIG. 5a. Wrapping, which arises when the Nyquist sampling theorem is not fulfilled, involves a frequency shift from π→-π or from -π→π. By phase compensating the signal (according to θ) in proportion to the previous time displacement, an adjusted (zero-centred) signal quantity is obtained according to FIG. 5b. The lines 32-36 in FIG. 5a and the lines 37-41 in FIG. 5b correspond to the normalized frequency variation of the illuminated targets 19-23. The Nyquist sampling theorem is described in the reference Samir S. Soliman, Mandyam D. Srinath, "Continuous and Discrete Signals and Systems", ISBN 0-13-569112-5, Prentice-Hall.

In the section above, it has been explained how the movement of the platform is taken into account. In order for this to be able to be realized, precise knowledge of the movement is required. As modern radar systems are increasingly being equipped with IMU-systems (Inertial Measurement Unit), the required platform movement can be measured with great precision.

According to previous requirements, it is necessary for all the targets to be separated by frequency in order for focusing FFT to be possible. How this is achieved is explained in greater detail here.

After approach compensation, all the targets are centred around the frequency zero. The target's frequency variation varies, however, dependent upon its angular position. Small target angles result in limited frequency bandwidth (size of gradient), which results in low resolution. Increasing target angles result in higher bandwidth and thereby improved resolution. In order to obtain the resolution that the bandwidth makes possible, it is necessary for frequency modulation of all the targets to be eliminated.

In order to make this possible, it is necessary to know the angle-dependent Doppler variation. The method proposed utilizes a reference target against which the phase variation is calculated. A reference function is created according to the following: place an imaginary reference target in the platform's direction of travel; assume that the reference target is illuminated during the whole of the flight distance and across all antenna angles; calculate the phase variation $\theta_{ref}$ that has arisen; create a reference signal according to $S_{ref}=\exp(j\theta_{ref})$; approach compensate $S_{ref}$ (only the phase needs to be taken into consideration).

The proposed reference function can be regarded as a signal created on the basis of the distance difference between the approach-compensated platform movement 31 and the imaginary positioned reference target. The frequency variation calculated in this way corresponds to the Doppler variation that has arisen for the whole target area. Only the difference is a constant frequency component, which makes target separation possible.

Figure 6A:
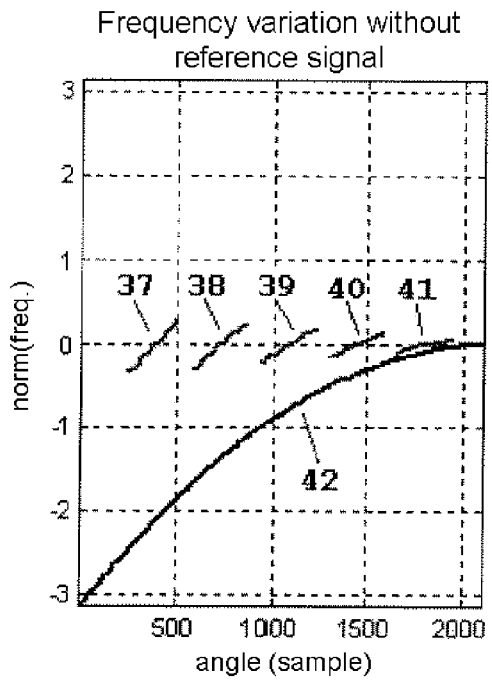
FIG. 6a shows a proposed reference function together with simulated point targets according to FIG. 2.

FIG. 6a illustrates the normalized frequency variation 42 of the reference function together with the corresponding values 37-41 of the illuminated targets.

Figure 6B:
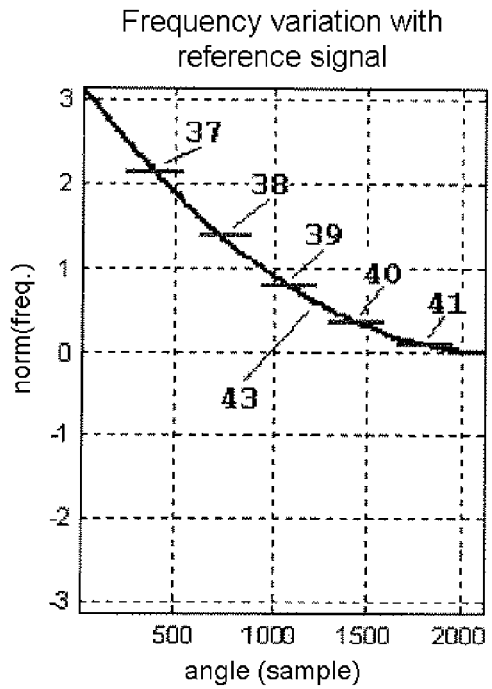
FIGS. 6b and 7a show the reference function conjugated according to FIG. 6a and simulated point targets according to FIG. 2 after demodulation using the reference function.

FIG. 6b shows how the targets 37-41 are separated with regard to frequency by demodulation, that is to say by multiplication of signal quantity and the conjugate 43 of the reference function 42. The ability to separate adjacent targets increases for large antenna angles, as the frequency derivative, the gradient of the curve, increases. This is in agreement with the equation for the angular resolution discussed in the introduction to this description, according to which high resolution is obtained for large target angles.

It is worth noting that the reference function 43 intersects the respective targets 37-41 at their midpoint. This fact, which is of great significance for the final image presentation, is discussed later in this section.

As target separation by frequency has been fulfilled, angle focusing a calculation-efficient Fourier transform is possible at this stage. In order to optimize the efficiency of the calculation, the FFT length is set to a second power by zero padding. The Fourier transform that integrates signal energy as a function of frequency creates here five well-compressed point targets, according to FIG. 7b.

Figure 7A:
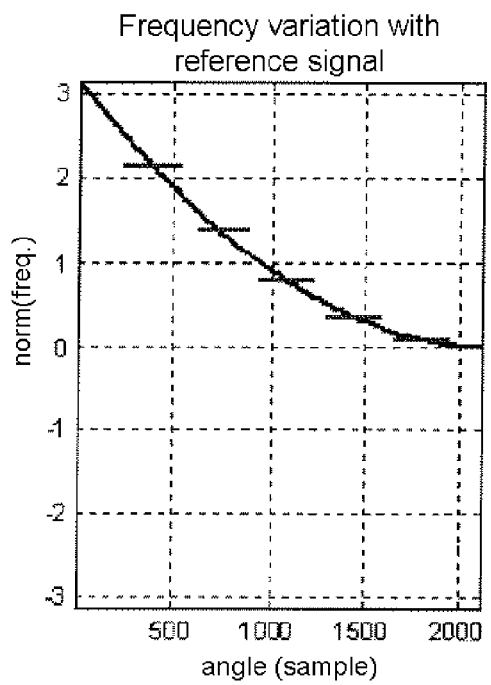
Figure 7B:
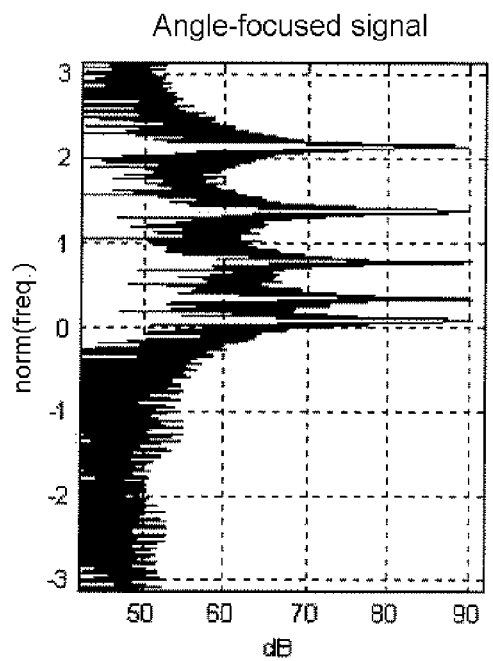
FIG. 7b shows an FFT-based angle focusing of the target according to FIG. 7a, where

As the frequency variation 59 of the reference function is non-linear, the demodulated point targets will also be separated in a non-linear way with regard to frequency. The result is thus that, after angle focusing, the original symmetrically-positioned targets are positioned asymmetrically. This fact that is illustrated in FIG. 7b and FIG. 8a means that an angle-related and frequency-related re-sampling must be carried out in order for correct image geometry to be obtained.

In the method according to the disclosure, this re-sampling is carried out by a transformation of the non-linear angle spectrum to a linear angle scale, according to FIG. 8b. The point targets in the simulation model are thus placed in the correct position, FIG. 8c, by projecting, see the lines 44-46, 47-49, 50-52, 53-55 and 56-58, the non-linear result from FIG. 8a onto a linear frequency scale, FIG. 8b. The projection thus involves the original spectrum being displaced as a function of the difference between the linear and non-linear frequency scales.

The re-sampling results, in addition, in the target's resolution becoming angle-dependent. A lower resolution is obtained for small target angles, while large target angles result in improved resolution. This conclusion that is in agreement with the equation for angular resolution is illustrated in FIG. 8c.

A result that relates to antenna scan with constant rate has been described above. It can, however, be attractive to vary the antenna's scan rate so that the angular resolution remains constant. This will be described in greater detail below.

A radar for reconnaissance has as its main task the location of interesting objects by means of generated radar images. In order that there shall be identical conditions with regard to detection and analysis over the whole of the illuminated area, constant resolution is required. This can be achieved by suitable variation of the scan rate.

In the equation relating to angular resolution discussed previously, a beam sharpening factor was included, according to:

$$R_{FSAR} = \frac{2\lambda v_p}{\omega_s l^2} \sin(\phi).$$

As there is a correlation between beam sharpening $R_{FSAR}$ and scan rate $\omega_s$, there is also a corresponding correlation between resolution and scan rate. By solving for the scan rate and assuming a constant value for the beam sharpening factor, the necessary scan rate is determined as $$\omega_s = \frac{2\lambda v_p}{R_{FSAR} l^2} \sin(\phi).$$

FIG. 9 illustrates how the scan rate can be varied as a function of the antenna angle. Utilization of the result in FIG. 9 gives an angle-dependent integration time $T_{int}$, which is given by effective antenna beam width divided by scan rate. The integration time corresponds to the time when a specific target is within the field of view of the antenna.

$$T_{int} = \frac{\lambda/l}{\omega_s}.$$

The equation above combined with the result in FIG. 9, shows that targets at small angles, close to the direction of travel, are illuminated for a longer time than targets at large angles. In this way, constant resolution is made possible.

A strength of the proposed SAR algorithm is that it also handles raw data collected with variable scan rate. As the scan rate is included in the creation of the reference function, no additional adjustment of the focusing method is required. In order to illustrate the above statement, the scene in FIG. 2 is simulated, but with a variable scan rate.

Figure 4B:
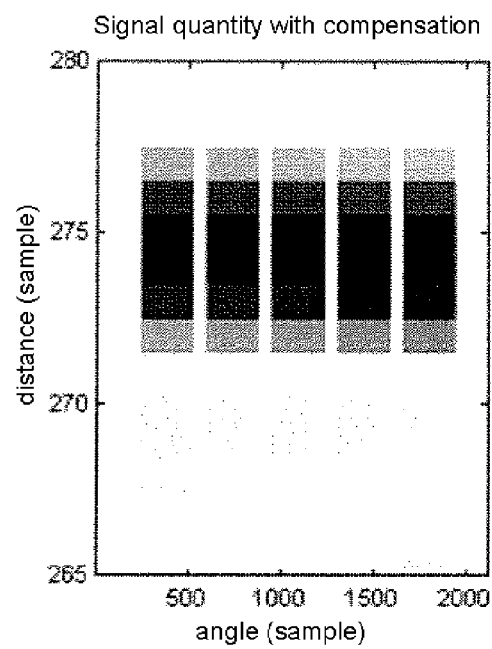
FIG. 4b shows an example of the effect of the distance variation according to FIG. 4a on signal quantity, but with time correction introduced.
Figure 5B:
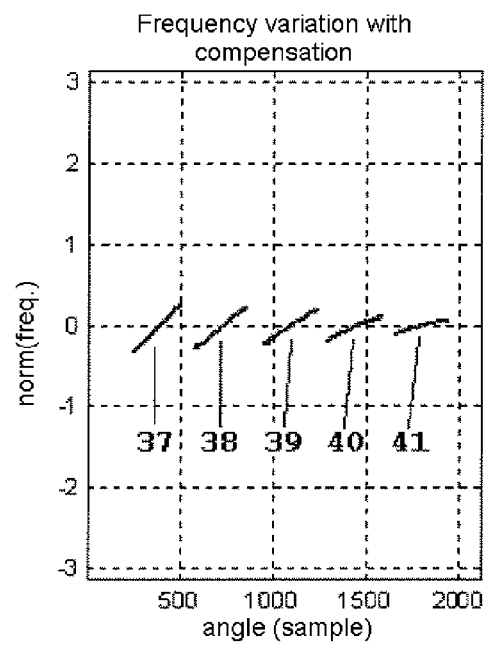
FIG. 5b shows an example of the effect of angle-dependent frequency displacement according to FIG. 5a, but with phase correction.
Figures 10A, 10B:
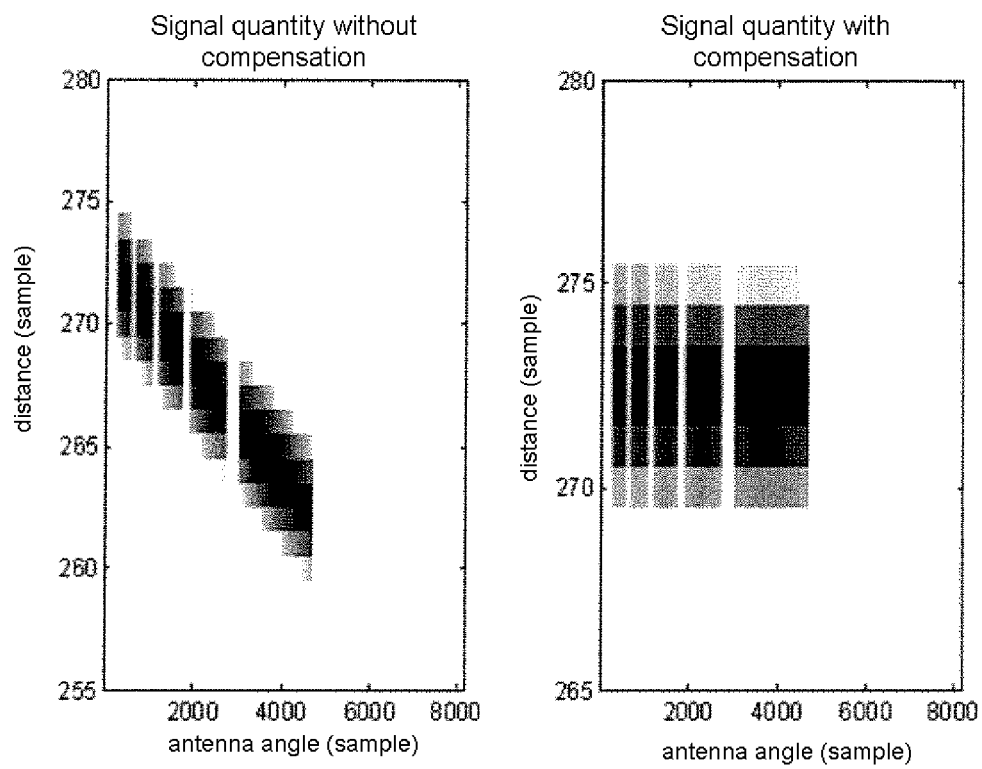
FIG. 10a shows an example of the effect of the distance variation on the signal quantity without time correction, for radar with variable scan rate.
FIG. 10b shows an example of the effect of the distance variation according to FIG. 10a on the signal quantity, but with the introduction of time correction.
Figure 11:
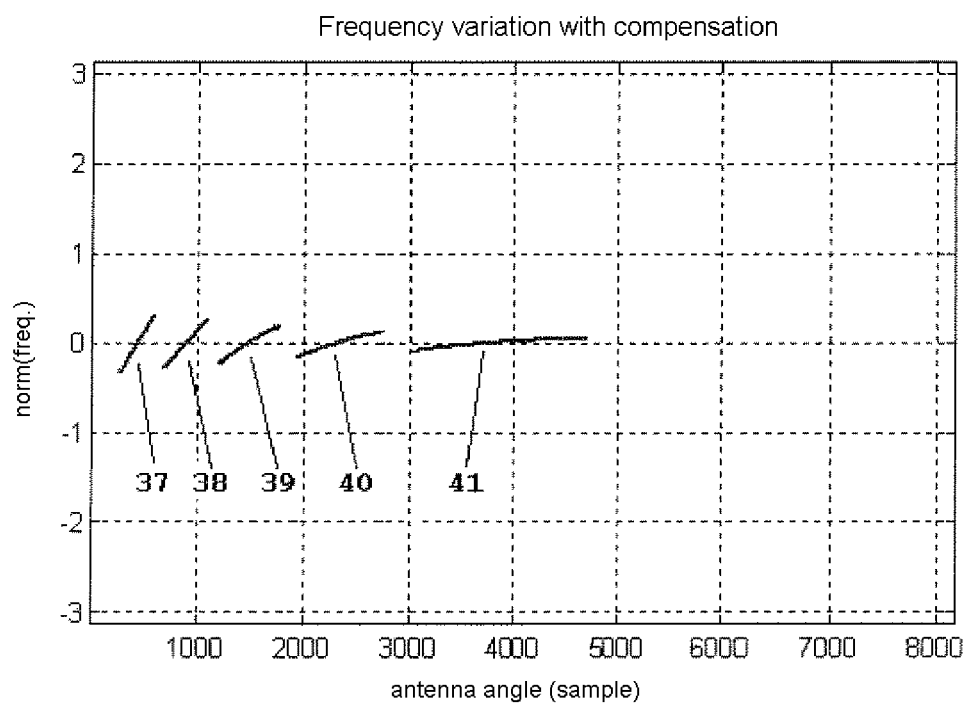
FIG. 11 shows an example of the target's frequency variation with approach compensation.

FIGS. 10a, 10b and FIG. 11 illustrate the effect of approach movement (compare with FIGS. 4a, 4b and 5b). As the illumination time varies, the size of the distance variation is angle dependent, see FIG. 10a. After time displacement, the signal energy comes within the correct distance gate. Corresponding phase displacement results, according to FIG. 11, in all the targets being centred around the frequency zero, precisely as before. The approach compensation is thus in agreement with the embodiment discussed previously.

Figure 12A:
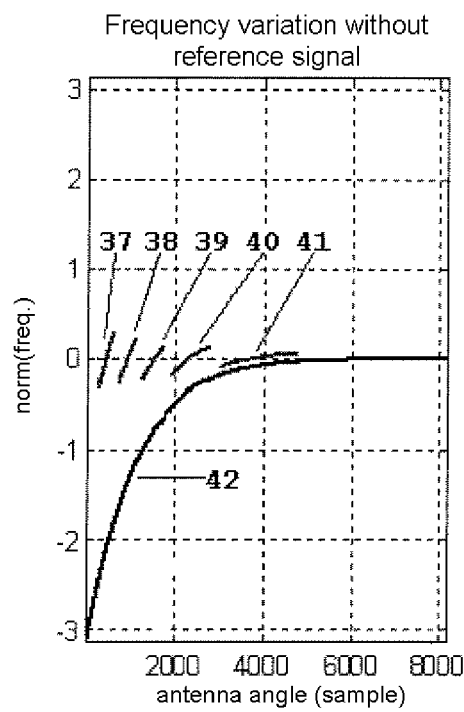
FIG. 12a shows an example of a proposed reference function for demodulation of illuminated targets together with the targets according to FIG. 2.
Figure 12B:
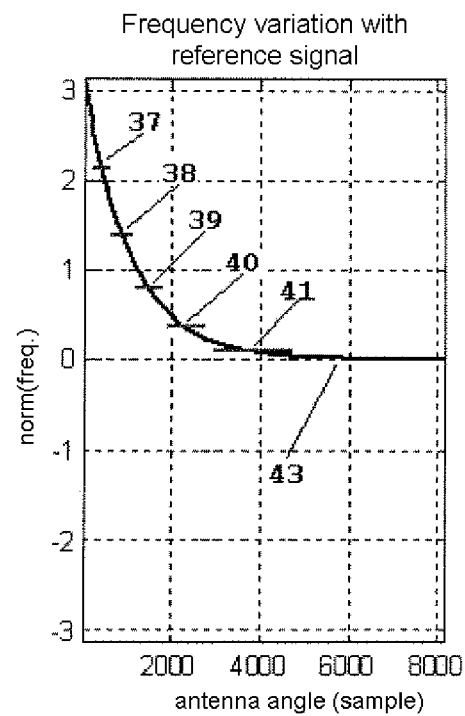
FIG. 12b shows the conjugate of the reference function in FIG. 12a and the targets after demodulation.

The creation of the reference function for demodulation/target separation, is carried out according to the method described previously. The result is shown in FIGS. 12a and 12b, which illustrate the target's frequency variation 37-41, in addition to the reference function's normalized frequency 42. FIG. 12b shows the result after demodulation. The conjugate of the reference function's normalized frequency is given the reference numeral 43 in FIG. 12b. The angle-independent resolution is obtained in this state by the predefined combination between integration time and frequency derivative.

Figure 13:
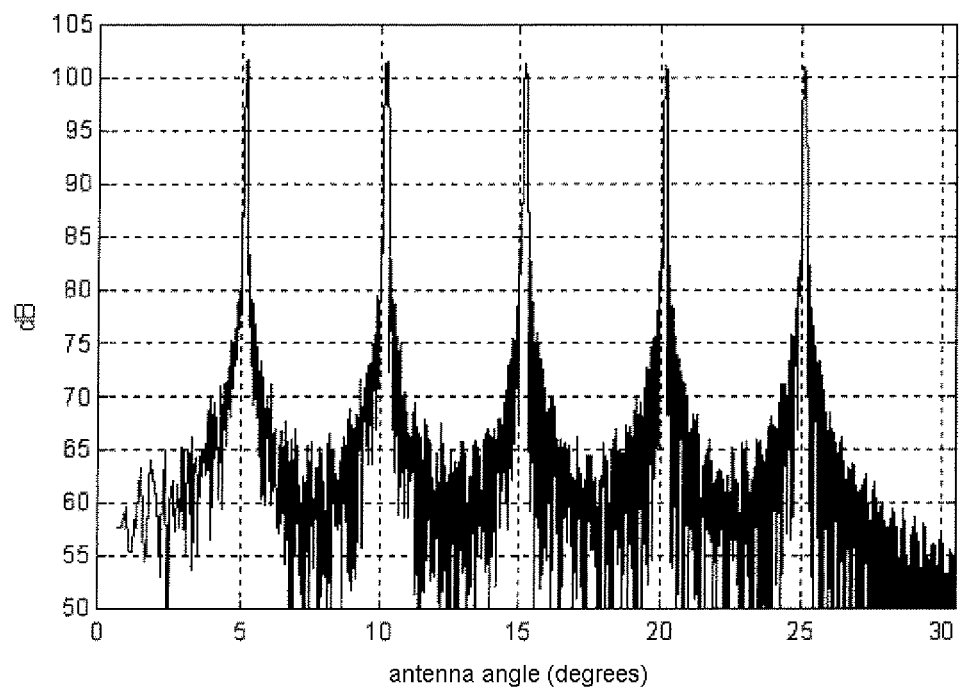
FIG. 13 shows, for a case with constant angular resolution, the result of demodulated signal quantity after FFT-focusing and projection onto a linear angle scale.

FIG. 13 illustrates the result after angle focusing of the demodulated signal quantity. The result is plotted here directly on a corrected angular scale in order to obtain the correct angular position. The result illustrates clearly that constant resolution can be also obtained when a scanning radar is utilized.

The relatively high sidelobe levels are due to no amplitude weighting having been carried out. It is, however, fully possible to introduce amplitude weighting according to known principles within the field of radar technology.

The disclosure is not intended to be limited to the embodiments described above, but can be modified within the framework of the following patent claims and inventive concept.

What is claimed as new and desired to be protected by Letters Patent of the United States is:

1. A method for mapping a target scene from a moving platform, the method comprising:
   providing a scanning Doppler radar sensitive to a relative movement between the radar and the target scene;
   calculating a movement of a platform on which a radar antenna is mounted utilizing navigation data obtained for the platform; and
   approach compensating a radar return signal,
   wherein, for approach compensation, a signal quantity related to pulses transmitted and received by the radar is transformed pulse by pulse to a corresponding movement-corrected signal quantity by displacement in time and phase, dependent upon a movement of the platform along an imaginary platform movement direction oriented in such a way that a momentary direction of a radar antenna is oriented at essentially 90° with respect to a direction of the movement of the imaginary platform.

2. The method of claim 1, wherein said approach compensating is carried out in a frequency plane, and wherein a size in time T and phase θ is obtained, respectively, by the correlations:

$T=2R/c$ and $\Theta=(4\pi/\lambda_c)R,$ where R is a distance a respective echo is to be displaced, c is a propagation speed, and $\lambda_c$ is a wavelength of the radar return signal.

3. The method of claim 1, wherein the signal quantity is pulse compressed, suitably in combination with a transformation to a movement-corrected signal quantity.

4. The method of claim 1, further comprising:
   creating a reference function by:
   placing a reference target in a direction of travel of the platform;
   illuminating the reference target throughout a whole of a movement of the platform and across all antenna angles;
   calculating a phase variation $\Theta_{ref}$ that has arisen;
   creating a reference signal according to $S_{ref}=\exp(j\Theta_{ref})$; and
   approach compensating $S_{ref}$,
   wherein the signal quantity is demodulated by multiplication with a conjugate of the reference function.

5. The method of claim 4, wherein the demodulated signal quantity is angle focused by using a calculation-efficient Fourier transform (FFT).

6. The method of claim 5, wherein the angle-focused signal quantity is projected onto a linear frequency scale.

7. The method of claim 1, wherein a scan rate of the scanning radar is kept constant.

8. The method of claim 1, wherein a scan rate of the scanning radar is varied in order to obtain a constant resolution within a scan area.

9. The method of claim 8, wherein the scan rate of the radar $\omega_s$ is determined from the correlation:

$$\omega_s = \frac{2\lambda v_p}{R_{FSAR} l^2}\sin(\phi),$$

where λ corresponds to a wavelength of the signal, $v_p$ is a platform speed, $R_{FSAR}$ is a beam sharpening factor, l is a physical size of the radar antenna, and φ is an antenna angle.

10. The method of claim 1, further comprising mapping the target scene within an angular range of approximately ±30° during an approach towards a target scene.

11. The method of claim 1, wherein said utilizing navigation data obtained for the platform utilizes data obtained from an INU (IMU+INS) system connected to the platform.

12. The method of claim 1, further comprising utilizing an additional radar-based mapping technique in a portion of a range to be mapped.

13. A system for mapping a target scene from a moving platform, the system comprising:
   a scanning Doppler radar and antenna mounted on the moving platform adapted to detect a relative movement between the radar and the target scene;
   a navigation circuit on the moving platform;

a movement calculating circuit that calculates a movement of the moving platform utilizing navigation data provided by the navigation circuit; and a compensating circuit that approach compensates a signal quantity related to pulses transmitted and received by the radar by pulse by pulse transformation to a corresponding movement-corrected signal quantity by displacement in time and phase, dependent upon the movement of the platform along an imaginary platform movement directed in such a way that a momentary direction of the radar antenna is oriented at essentially 90° with respect to a direction of the movement of the imaginary platform.

14. The system of claim 13, wherein said compensating circuit operates in a frequency plane, and wherein a size in time T and phase θ is obtained, respectively, by the correlations:

$$T = 2R/c \text{ and}$$

$$\Theta = (4\pi/\lambda_c)R,$$

where R is a distance a respective echo is to be displaced, c is a propagation speed, and $\lambda_c$ is a wavelength of the radar return signal.

15. The system of claim 13, further comprising a pulse compression circuit that pulse compresses the signal quantity, suitably in combination with a transformation to a movement-corrected signal quantity.

16. The system of claim 13, further comprising a reference function generating circuit that creates a reference function by:

placing a reference target in a direction of travel of the platform;

illuminating the reference target throughout a whole of a movement of the platform and across all antenna angles;

calculating a phase variation $\Theta_{ref}$ that has arisen;

creating a reference signal according to $S_{ref} = \exp(j\Theta_{ref})$; and approach compensating $S_{ref}$, wherein the reference function generating circuit demodulates the signal quantity by multiplying a conjugate of the reference function.

17. The system of claim 13, further comprising a Fourier Transform circuit, wherein the FFT circuit angle focuses the demodulated signal quantity by using a calculation-efficient Fourier transform (FFT).

18. The system of claim 13, wherein a scan rate of the scanning radar is kept constant.

19. The system of claim 13, wherein a scan rate of the scanning radar is varied in order to obtain a constant resolution within a scan area.

20. The system of claim 13, wherein said navigation circuit on the moving platform comprises an inertial navigation unit (INU) including an inertial measurement unit (IMU) and an inertial navigation system (INS) system connected to the platform.

* * * * *